US011812709B2

(12) United States Patent
Marek et al.

(10) Patent No.: US 11,812,709 B2
(45) Date of Patent: Nov. 14, 2023

(54) VERTICAL FARM

(71) Applicant: Skyscraper Farm LLC, Alexandria, VA (US)

(72) Inventors: Lawrence Marek, New York, NY (US); Nickolas Starling, Alexandria, VA (US)

(73) Assignee: SKYSCRAPER FARM LLC, Alexandria, VA (US)

( * ) Notice: Subject to any disclaimer, the term of this patent is extended or adjusted under 35 U.S.C. 154(b) by 1308 days.

(21) Appl. No.: 15/378,927

(22) Filed: Dec. 14, 2016

(65) Prior Publication Data

US 2018/0070538 A1    Mar. 15, 2018

Related U.S. Application Data

(60) Provisional application No. 62/267,192, filed on Dec. 14, 2015.

(51) Int. Cl.
*A01G 9/14*      (2006.01)

(52) U.S. Cl.
CPC ................ *A01G 9/14* (2013.01); *Y02A 40/25* (2018.01)

(58) Field of Classification Search
CPC ........................... A01G 9/14; A01G 2009/1484
USPC ............................................................ 47/17
See application file for complete search history.

(56) References Cited

U.S. PATENT DOCUMENTS

| | | | | |
|---|---|---|---|---|
| 3,290,837 | A * | 12/1966 | Weston | E04H 3/00 |
| | | | | 52/175 |
| 9,585,315 | B2 * | 3/2017 | Villamar | A01K 61/80 |
| 2009/0307973 | A1 * | 12/2009 | Adams | A01G 31/06 |
| | | | | 47/62 C |
| 2010/0257782 | A1 | 10/2010 | Giesen et al. | |
| 2011/0267713 | A1 | 3/2011 | Ventelon et al. | |
| 2013/0104453 | A1 * | 5/2013 | Hassle | A01G 9/14 |
| | | | | 47/17 |

(Continued)

FOREIGN PATENT DOCUMENTS

| | | | | |
|---|---|---|---|---|
| GB | 922293 | * | 4/1960 | |
| GB | 1203163 A | * | 8/1970 | ............. A01G 9/241 |

(Continued)

OTHER PUBLICATIONS

International Search Report and Written Opinion dated Apr. 25, 2019 for International Patent Application No. PCT/US2019/017229.

(Continued)

*Primary Examiner* — Son T Nguyen
(74) *Attorney, Agent, or Firm* — Morgan, Lewis & Bockius LLP

(57) ABSTRACT

A device comprising a spiral building having greenhouse enclosures mounted thereon. The greenhouse enclosures include an interior growing area and at least one slanted glass surface having a reflective surface. The at least one slanted glass surface is disposed over a growing tray which is orientated towards perpendicular rays of the sun, when the sun is at an equinox. The reflective surface of the at least one slanted glass surface is reversed from its normal orientation such that the reflective surface is disposed on an inside of the at least one slanted glass surface, thus reflecting light admitted through the at least one slanted glass surface and directing the light to parts of the interior growing area.

8 Claims, 24 Drawing Sheets

(56) References Cited

U.S. PATENT DOCUMENTS

2016/0192607 A1* 7/2016 Kitagawa ............... A01G 31/06
                                                     47/62 E
2016/0212946 A1* 7/2016 Higgins ............... A01G 9/1423
2018/0070538 A1    3/2018 Marek

FOREIGN PATENT DOCUMENTS

JP        03293487 A  * 12/1991
WO     WO-9320683 A1 * 10/1993  ............... A01G 9/14
WO    WO20100138027 A1 * 12/2010

OTHER PUBLICATIONS

Should cities be self-sufficient? An argument for vertical urban farms' (Nusca) Jan. 24, 2011; retrieved from https://www.zdnet.com/article/should-cities-be-self-sufficient-an-argument-for-vertical-urban-farms, entire document, especially p. 1,2.
English Translation of Examination Report for Pakistan Patent Application No. 66/2019, 1 pg.

* cited by examiner

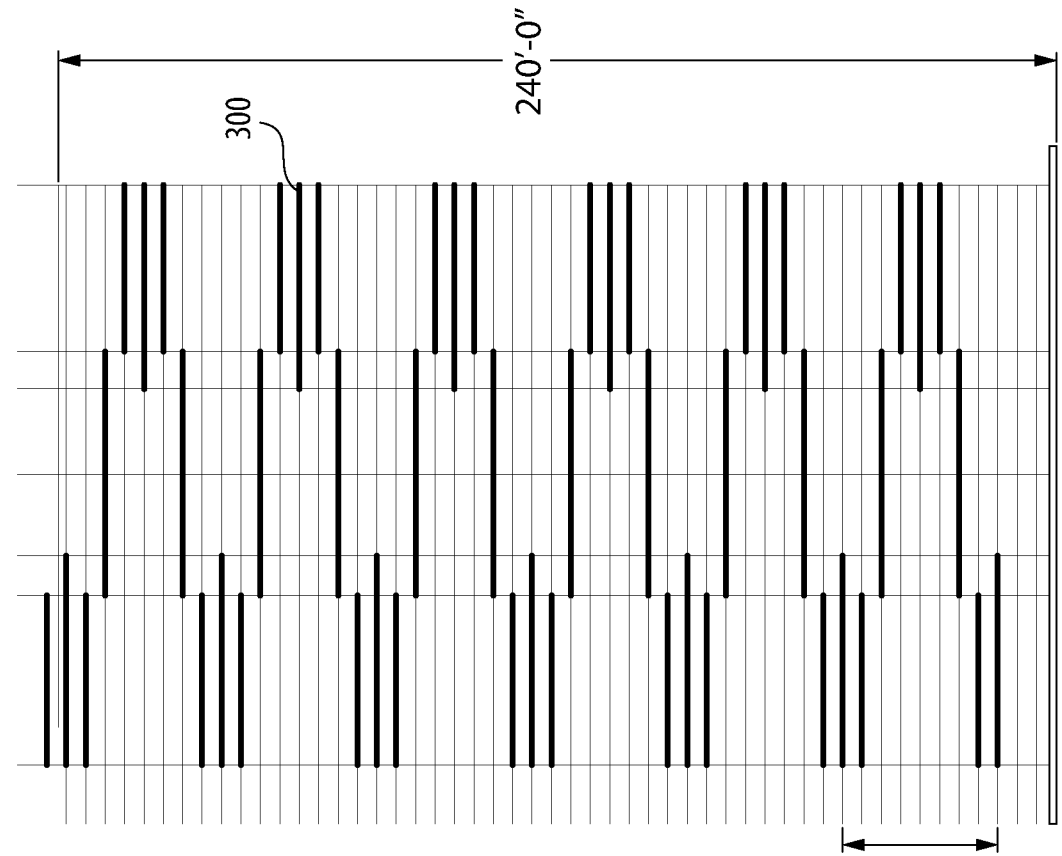
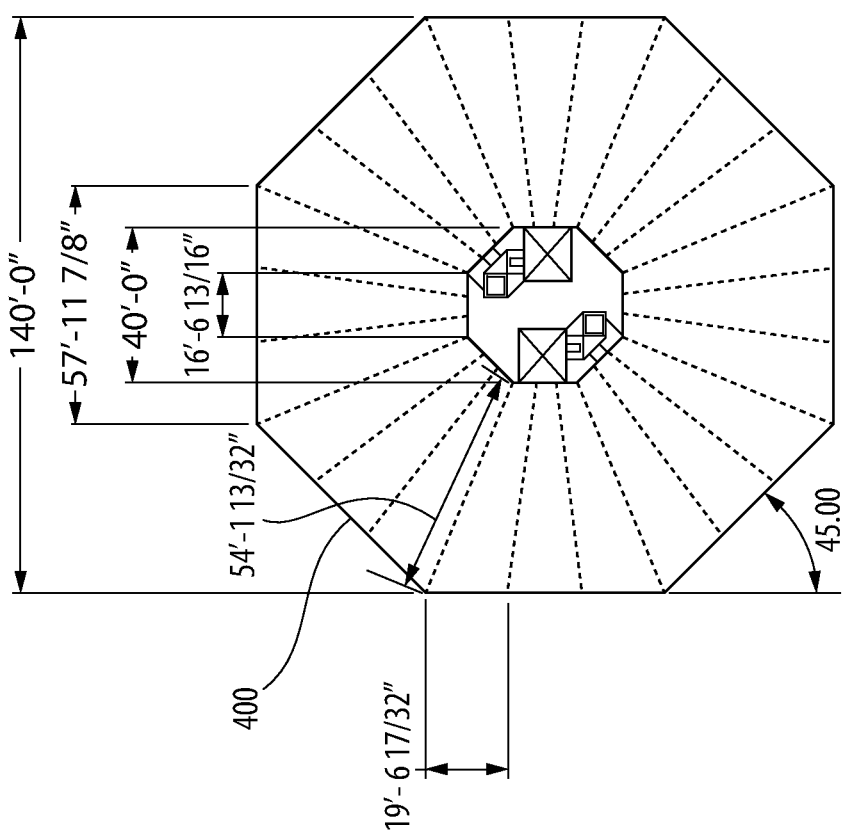
FIG. 8

PIECE "E.1"
15.7395 + ((16.5224 − 15.7395)/2) = 16.131 SF
16.131 X 14 = 225.834 CF
225.834 − (7 X .833 X 1) − ((2.334 X .667 X 1) X 2) −((2.334 X .833 X 1) / 2) = 215.917 CF
215.917 / 27 = 7.9969 CYD
7.9969 YARDS CONCRETE @ 4,000 LBS/YD = 31,987.6 LBS
31,967.6 LBS / 2,000 LBS = 15.9 US TONS

PIECE E.1 CAN BE CAST IN TWO SEPARATE PIECES = 7.95 US TONS

PIECE "E.2"
15.7395 + ((16.5225 − 15.7395)/2) = 16.131 SF
16.131 X 14 = 225.834 CF
225.834 − (10 X 10 X 1) = 125.834 CF
125.834 / 27 = 4.6605 CYD
4.6605 YARDS CONCRETE @ 4,000 LBS/YD = 18,642.0 LBS
18,642.0 LBS / 2,000 LBS = 9.3 US TONS

PIECE "E.3"
15.7395 + ((16.5225 - 15.7395)/2) = 16.131 SF
16.131 X 14 = 225.834 CF
225.834 / 27 = 8.3642 CYD
8.3642 YARDS CONCRETE @ 4,000 LBS/YD = 33,456.8 LBS
33,456.8 LBS / 2,000 LBS = 16.7 US TONS

PIECE E.3 CAN BE CAST IN TWO SEPARATE PIECES = 8.35 US TONS

PIECE "E.4"
15.7395 + ((16.5225 - 15.7395)/2) = 16.131 SF
16.131 X 9.334 = 150.5667 CF
150.5667 / 27 = 5.5765 CYD
5.5765 YARDS CONCRETE @ 4,000 LBS/YD = 22,306.0 LBS
22,306.0 LBS / 2,000 LBS = 11.2 US TONS

PIECE E.4 CAN BE CAST IN TWO SEPARATE PIECES = 5.6 US TONS

PIECE "F"
Fa = 3.1415 x 37.334 = 117.2847 CF / 27 = 4.3438 CYD X 4,000 = 17,375.2 LBS/2,000 = 8.7 US TONS
Fb = 3.1415 x 43.667 = 137.1796 CF / 27 = 5.0607 CYD X 4,000 = 20,322.8 LBS/2,000 = 10.2 US TONS
Fc = 3.1415 x 39.0 = 122.5185 CF / 27 = 4.5377 CYD X 4,000 = 18,150.8 LBS/2,000 = 9.0 US TONS
Fd = 3.1415 x 34.334 = 107.8602 CF / 27 = 3.9948 CYD X 4,000 = 15,979.2 LBS/2,000 = 8.0 US TONS
Fe = 3.1415 x 29.667 = 93.1968 CF / 27 = 3.4518 CYD X 4,000 = 13,687.2 LBS/2,000 = 6.8 US TONS
Ff = 3.1415 x 25.0 = 78.5375 CF / 27 = 2.9087 CYD X 4,000 = 11,634.8 LBS/2,000 = 5.8 US TONS
Fg = 3.1415 x 20.334 = 63.8792 CF / 27 = 2.3668 CYD X 4,000 = 9,463.2 LBS/2,000 = 4.7 US TONS
Fh = 3.1415 x 15.667 = 49.2178 CF / 27 = 1.8228 CYD X 4,000 = 7,291.2 LBS/2,000 = 3.6 US TONS
Fj = 3.1415 x 11.0 = 34.5565 CF / 27 = 1.2798 CYD X 4,000 = 5,119.2 LBS/2,000 = 2.6 US TONS

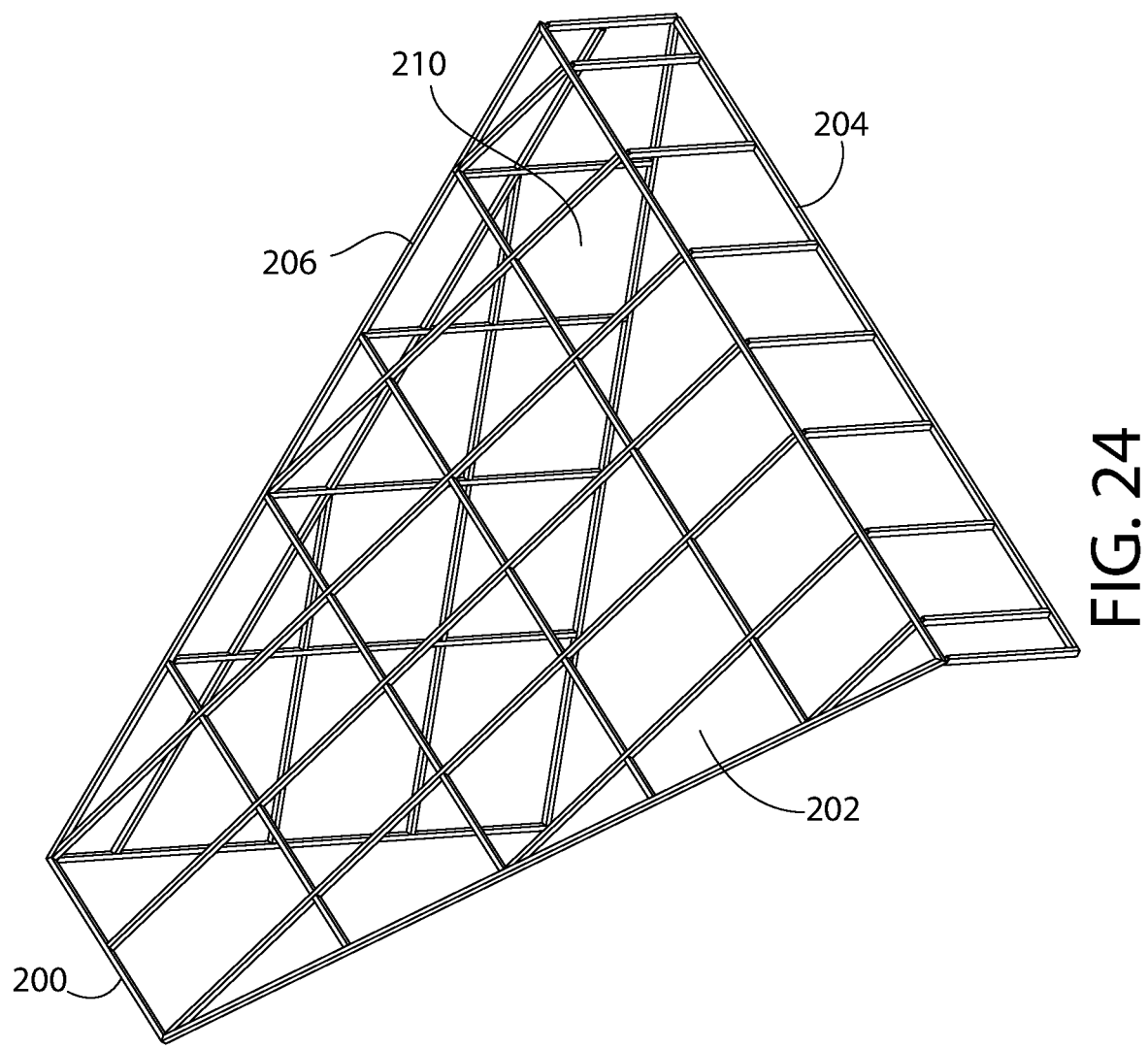

VERTICAL FARM

FIELD OF THE INVENTION

The present invention relates to an architecture for vertical farming, and more particularly, to a structure for capturing the maximum amount of natural light in the vertical farm growing areas.

BRIEF SUMMARY OF THE INVENTION

A list of design items that include some, but not all of the novel aspects of my version of the vertical farm 300 follows:
1. The spiral design 400 will always be oriented towards the morning light and reduce the glare of the western (setting) sun, which is the optimum daylight spectra for growing plants.
2. The slanted surface of the glass 102 over the growing trays 104 will be oriented toward the perpendicular rays of the sun at the equinox, thus allowing the maximum amount of natural light to reach the growing surfaces 106, averaged over the full twelve months of the year. The angle of this surface 102 will vary depending on the position of the farm north or south of the equator. The further north or south, the more vertical the angle, as the sun is, on average, lower in the sky the further north or south of the equator one moves.
3. The glazing in selected portions of the exterior 112 will be reversed from its normal orientation and the reflective surfaces 108 will be on the inside, thus reflecting the light admitted through the glass 102 and directing it to parts of the interior growing area 110 that would normally not get natural light. This will diminish the need for the use of LED lights. Even though the LED lights consume less electric power than do other types of bulbs, they still consume power and thus cost money.
4. Various reflective surfaces will be incorporated into the structure 300 to facilitate the distribution of natural light to all parts of the growing trays 104. These will probably be made of mylar canvas, so that they can be adjusted by the farm workers to operate at maximum efficiency at all times of the year.
5. The 240' high version is designed as precast concrete pieces that can be cast anywhere and shipped anywhere in the world and then erected on site. This is accomplished in the following manner:
    (a) Each component is sized so that 96% of the seaports in the world have cranes strong enough to lift an individual piece.
    (b) All of the components can be transported by truck from the port to the building site. They will fit on a flatbed truck, not exceed the load limits on most roadways in the world and clear most obstacles on most roadways in the world.
    (c) All of the components will fit on a standard sea going barge, allowing them to be towed by seagoing tug boats to any place in the world.

Larger versions of the vertical farm 300 can be easily done using standard cast in place concrete as the building method, being able to be erected higher and larger in diameter if the site and the projected need warrant it.

In all other aspects the vertical farm 300 utilizes standard construction techniques as would be applied to any factory structure, anywhere in the world.

BRIEF DESCRIPTION OF THE DRAWINGS

FIG. 8 is a cross section of a skyscraper embodiment of the present invention.

FIG. 24 is a depiction of another pie shaped glass enclosure in an embodiment of the present invention.

DETAILED DESCRIPTION OF THE INVENTION

TABLE 1

SCHEDULE OF PRECAST STRUCTURAL CONCRETE COMPONENTS NEEDED TO CONSTRUCT A 240 FOOT HIGH VERTICAL FARM BUILDING

Figure 1:
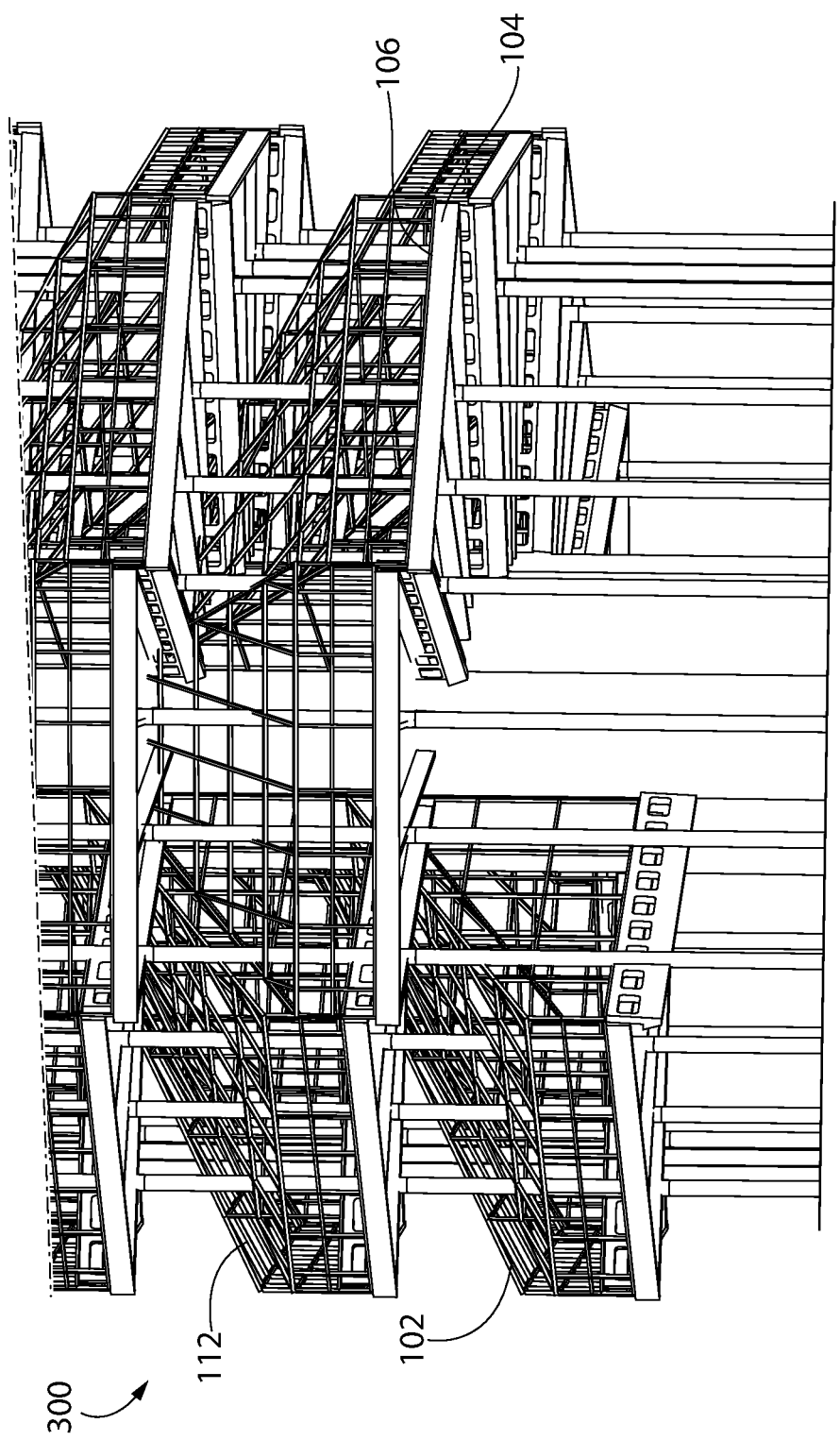
FIG. 1 is a close up depiction of a skyscraper embodiment of the present invention.
Figure 2:
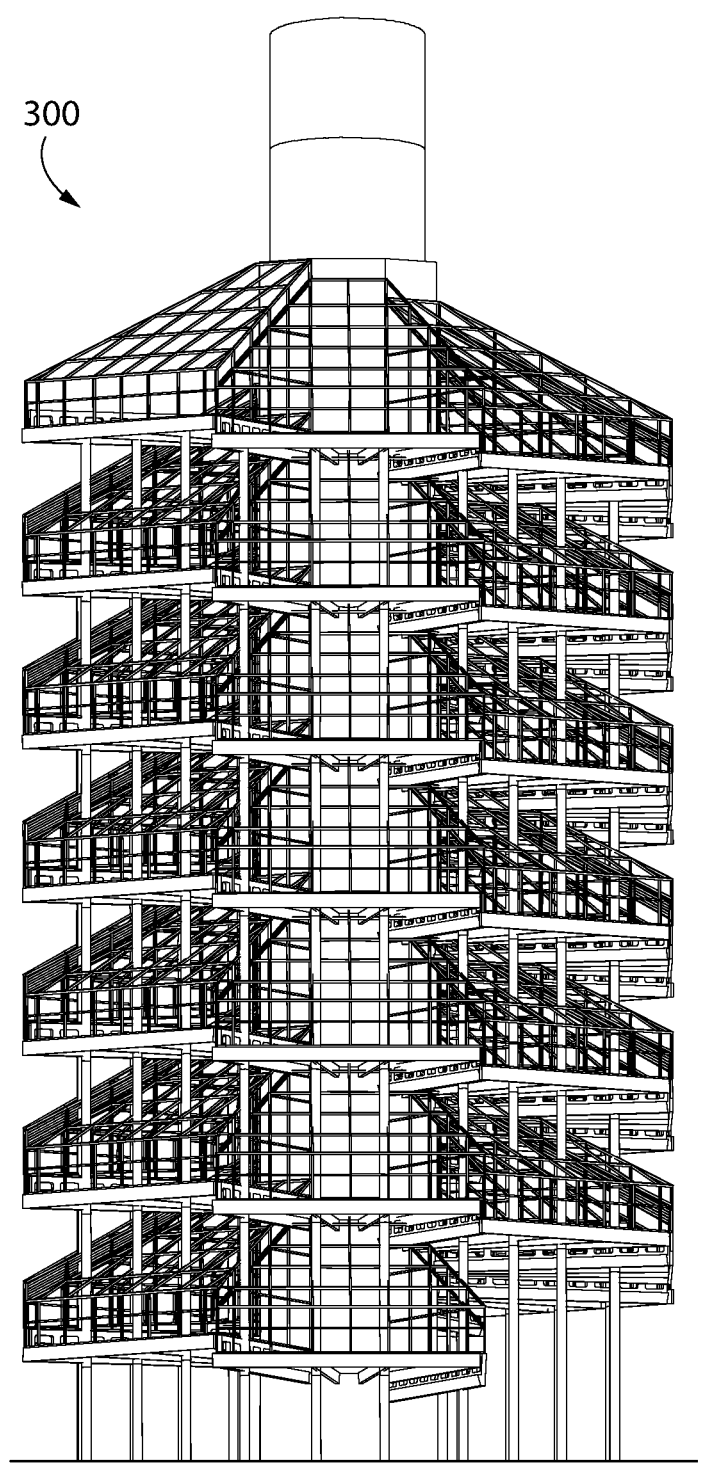
FIG. 2 is a depiction of a skyscraper embodiment of the present invention.
Figure 3:
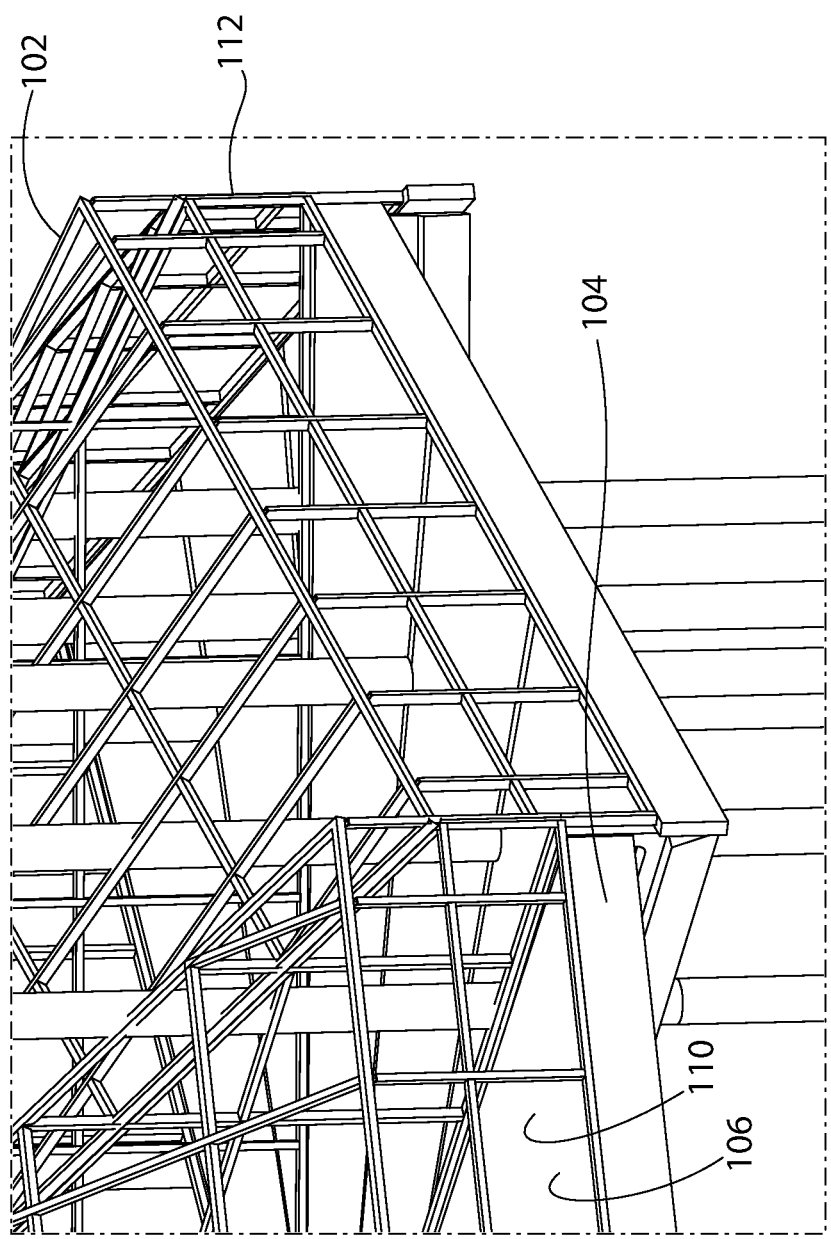
FIG. 3 is a close up depiction of a skyscraper embodiment of the present invention.
Figure 4:
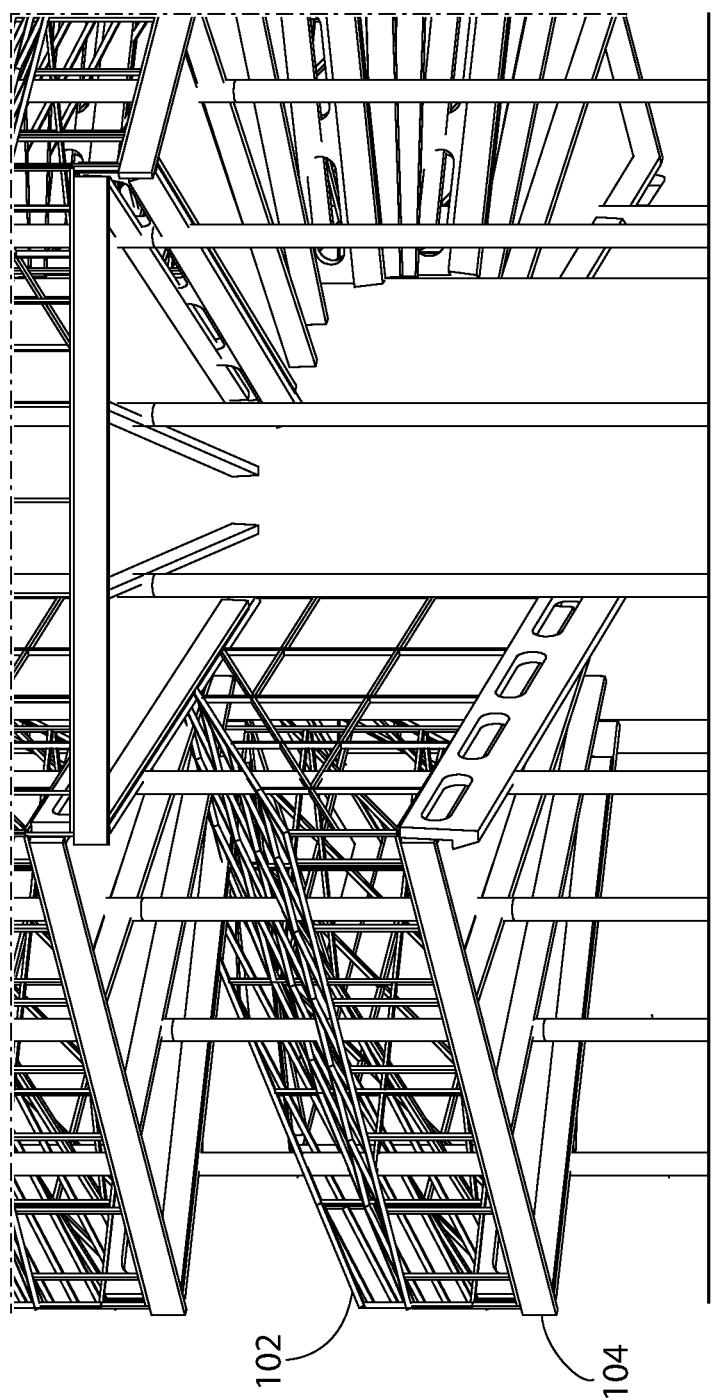
FIG. 4 is a close up depiction of the bottom of a skyscraper embodiment of the present invention.
Figure 5:
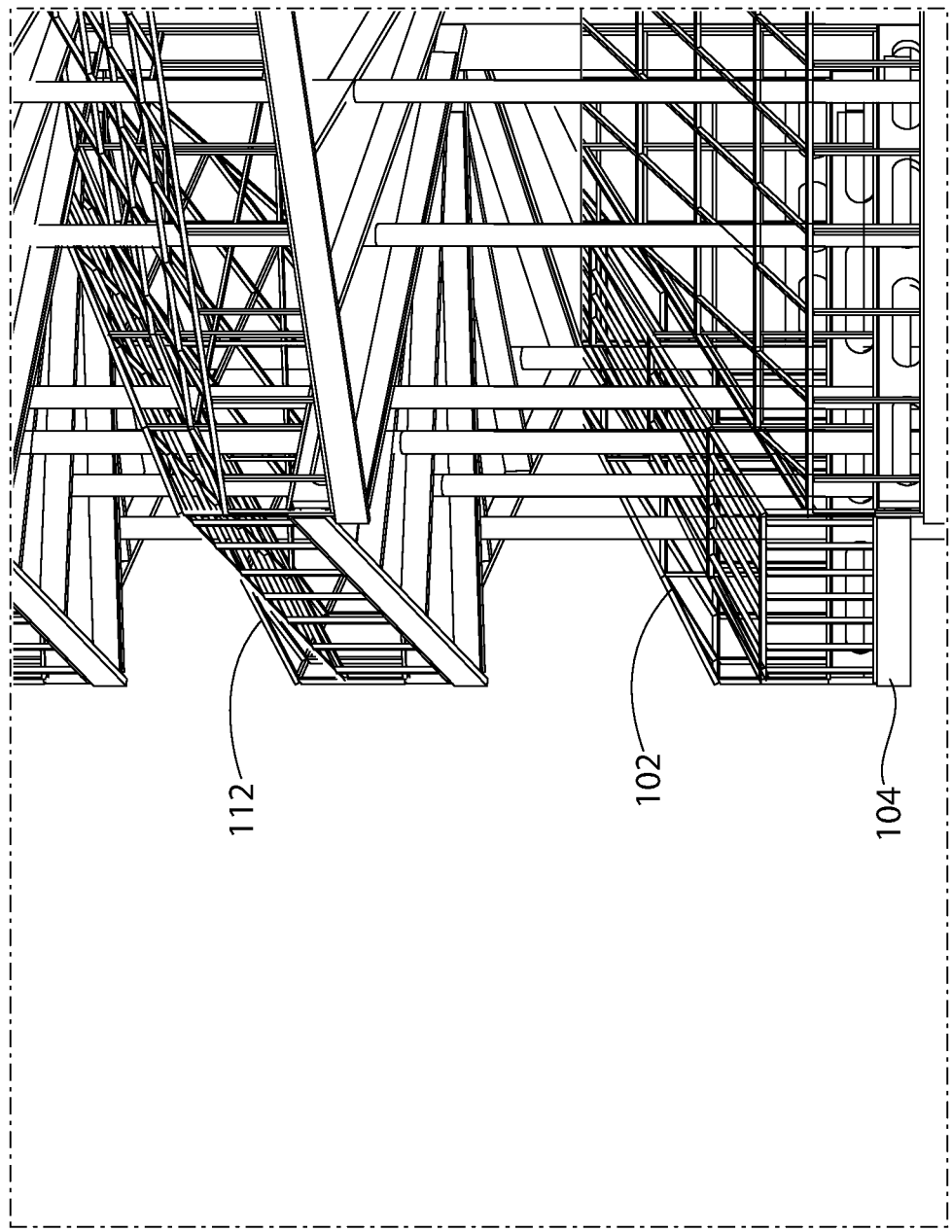
FIG. 5 is a close up depiction of the side of a skyscraper embodiment of the present invention.
Figure 6:
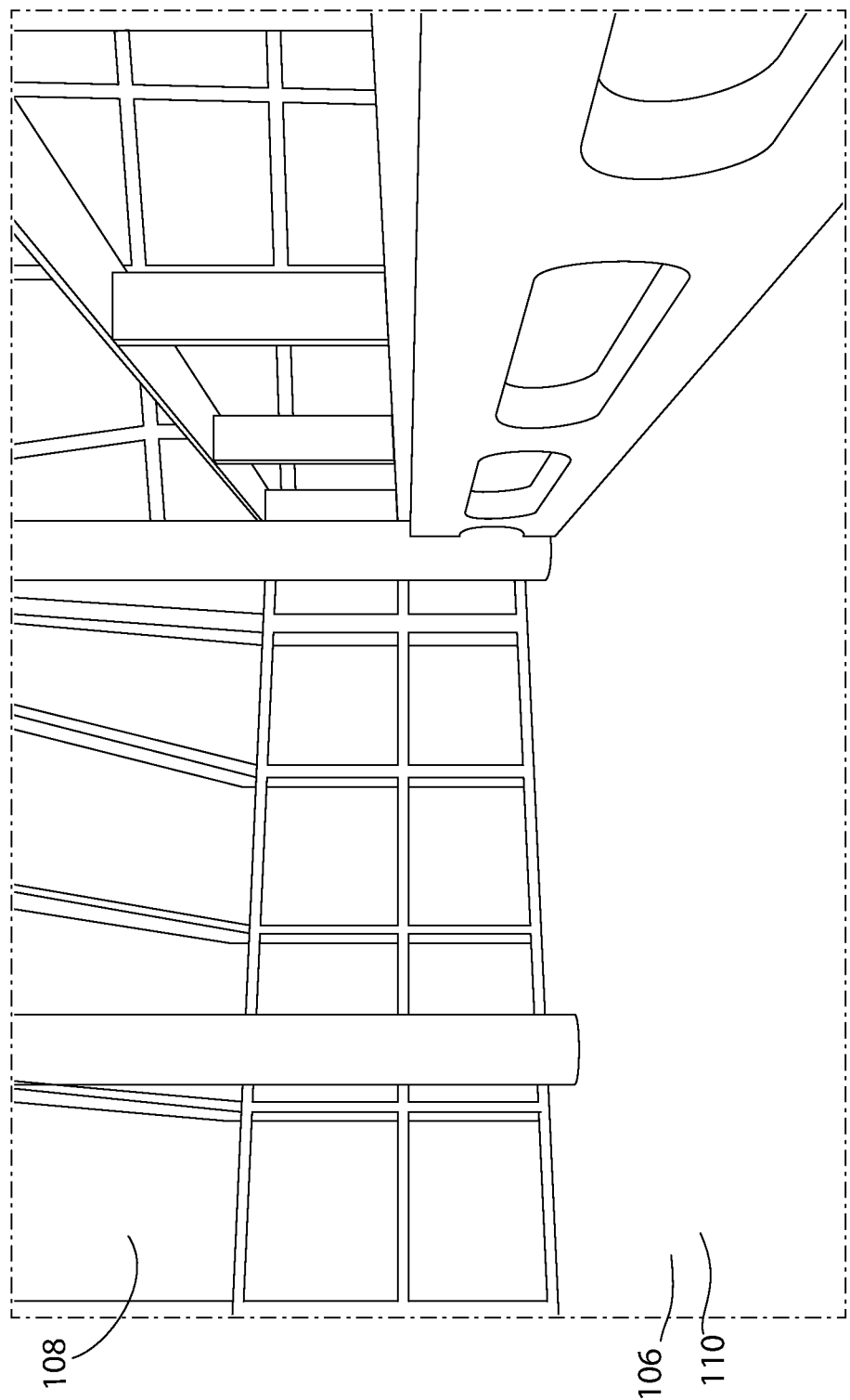
FIG. 6 is a close up depiction of an interior floor of a skyscraper embodiment of the present invention.
Figure 7:
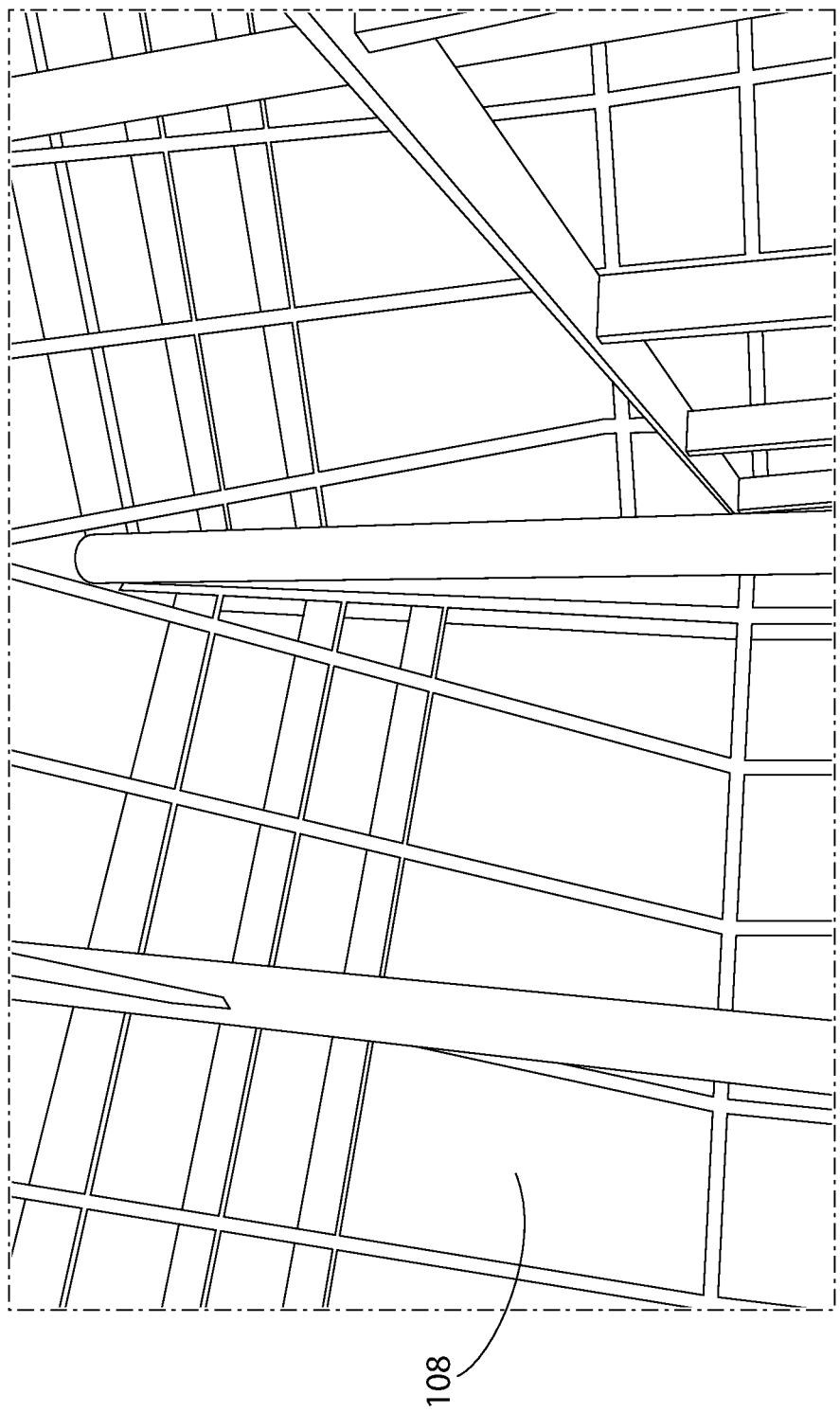
FIG. 7 is a close up depiction of interior windows of a skyscraper embodiment of the present invention.
Figure 9:
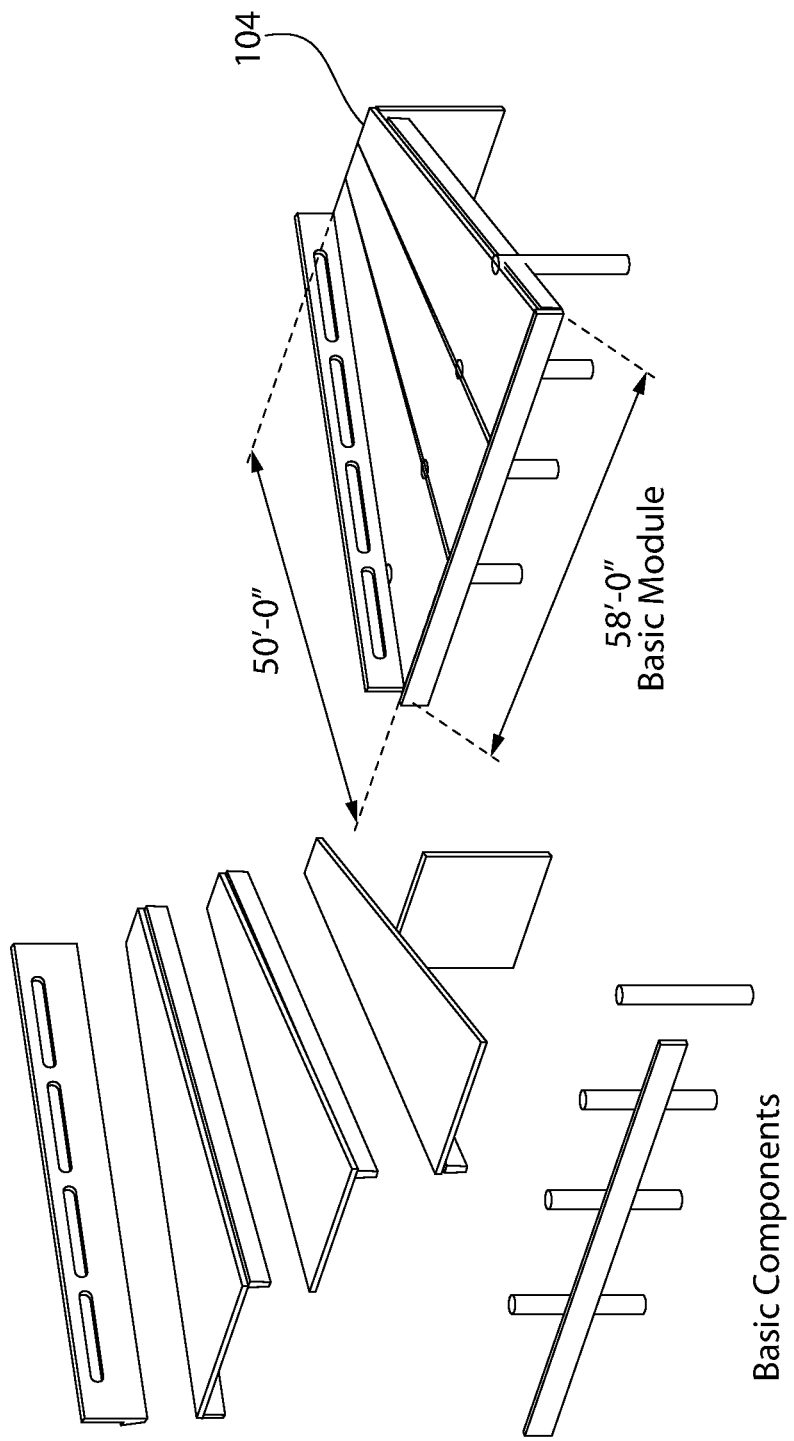
FIG. 9 is blown out view of basic components and a basic module of a skyscraper embodiment of the present invention.
Figure 10:
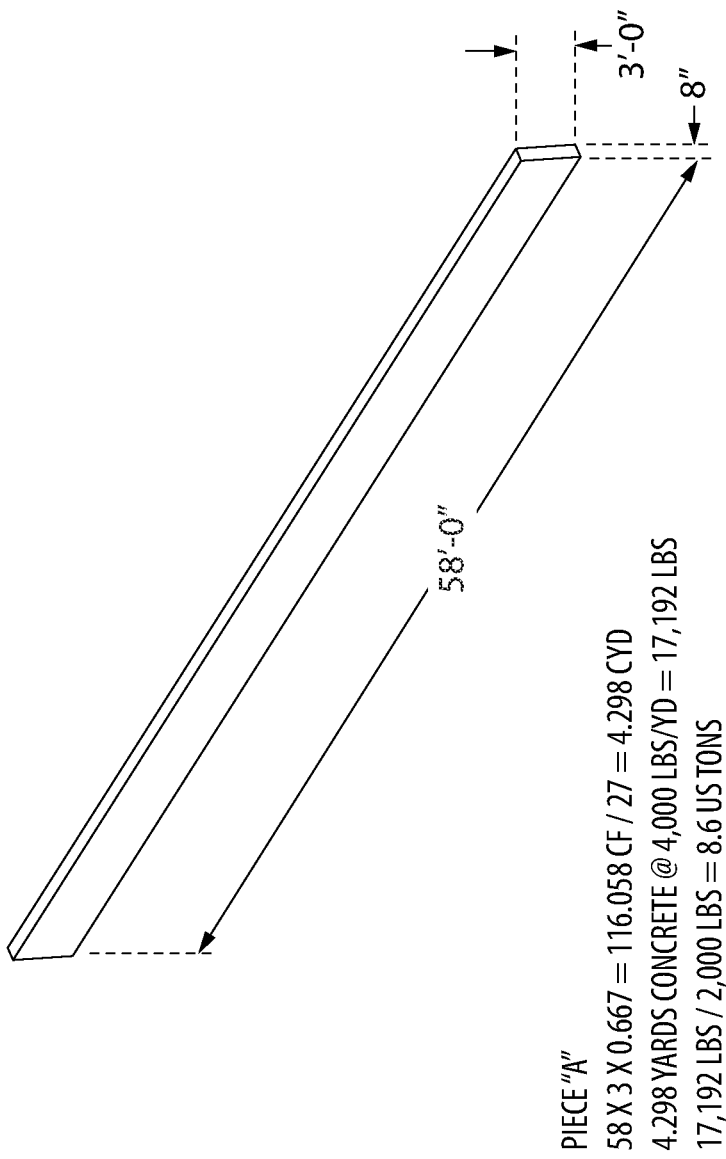
FIG. 10 is a depiction of a piece of a skyscraper embodiment of the present invention.
Figure 11:
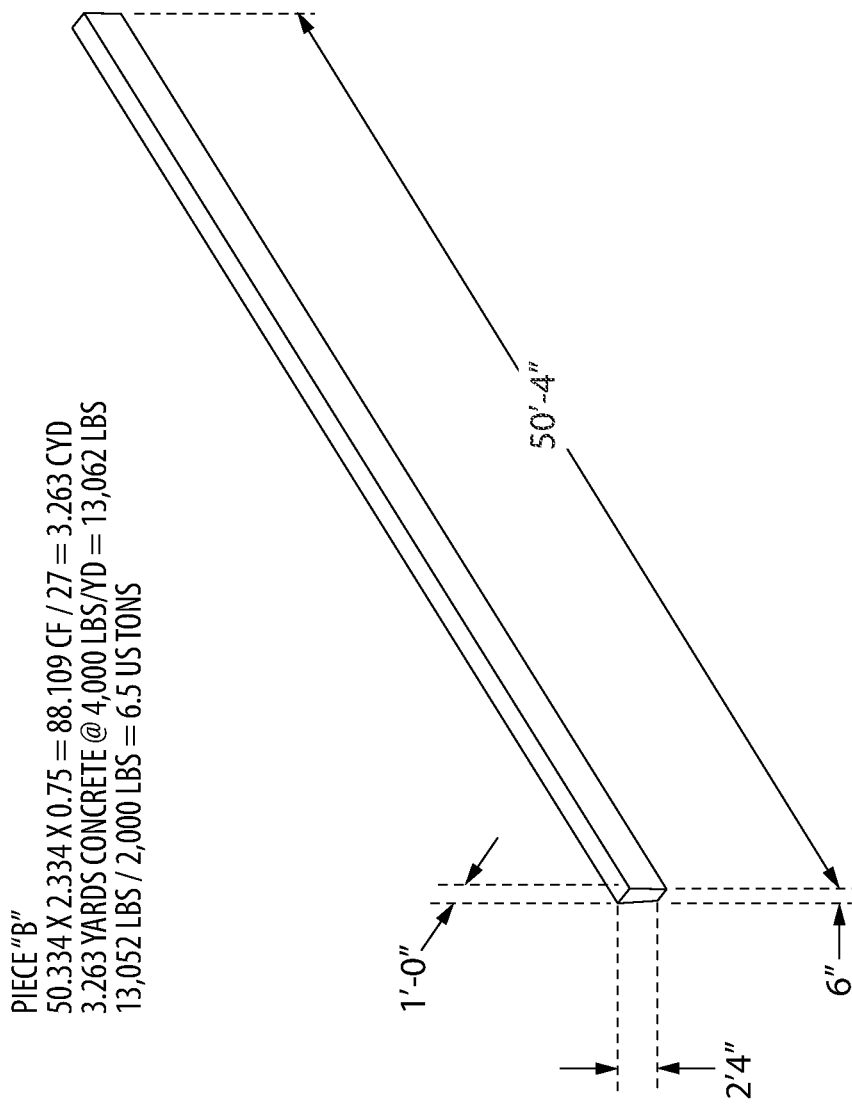
FIG. 11 is a depiction of another piece of a skyscraper embodiment of the present invention.
Figure 12:
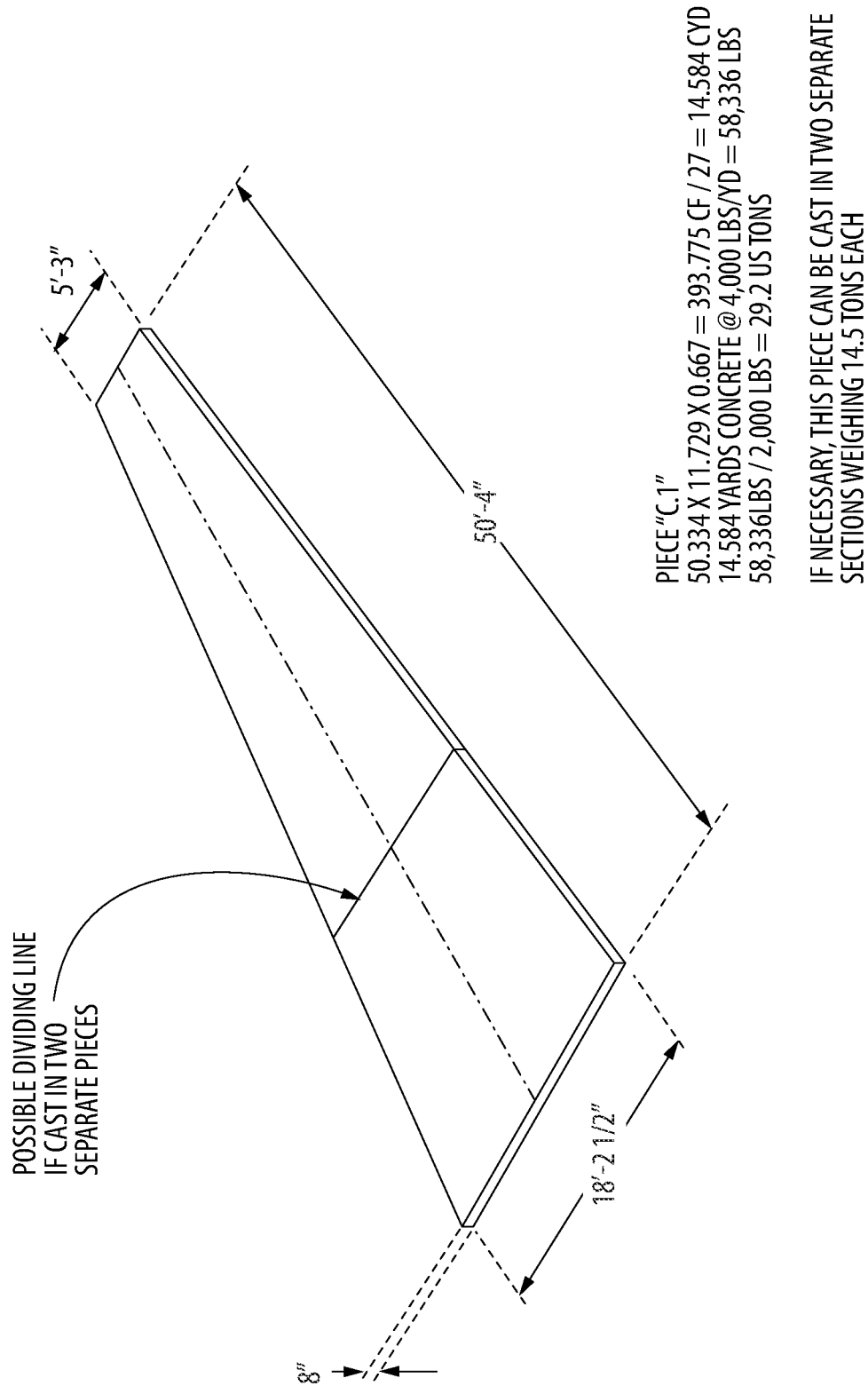
FIG. 12 is a depiction of yet another piece of a skyscraper embodiment of the present invention.
Figure 13:
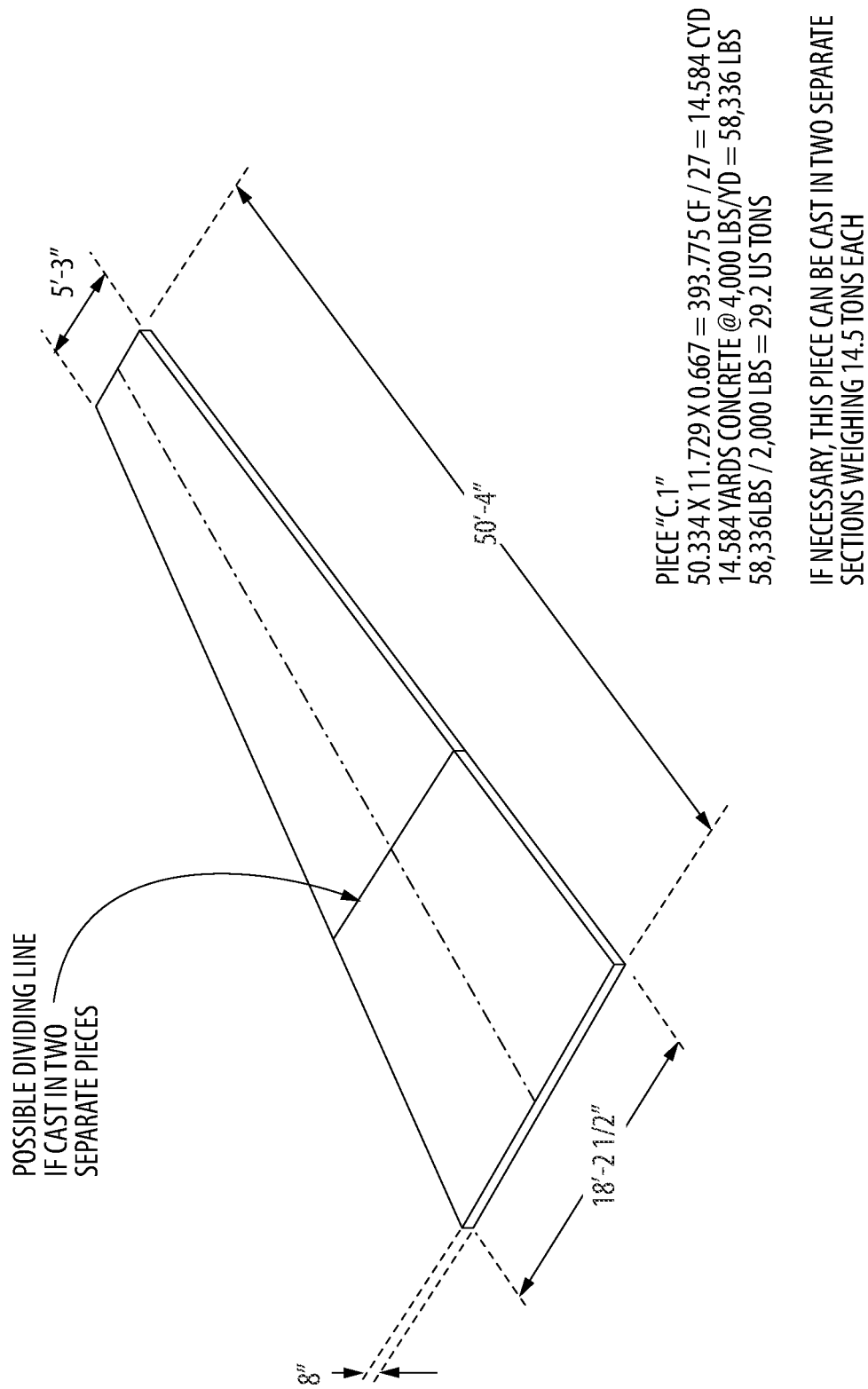
FIG. 13 is a depiction of yet another piece of a skyscraper embodiment of the present invention.
Figure 14:
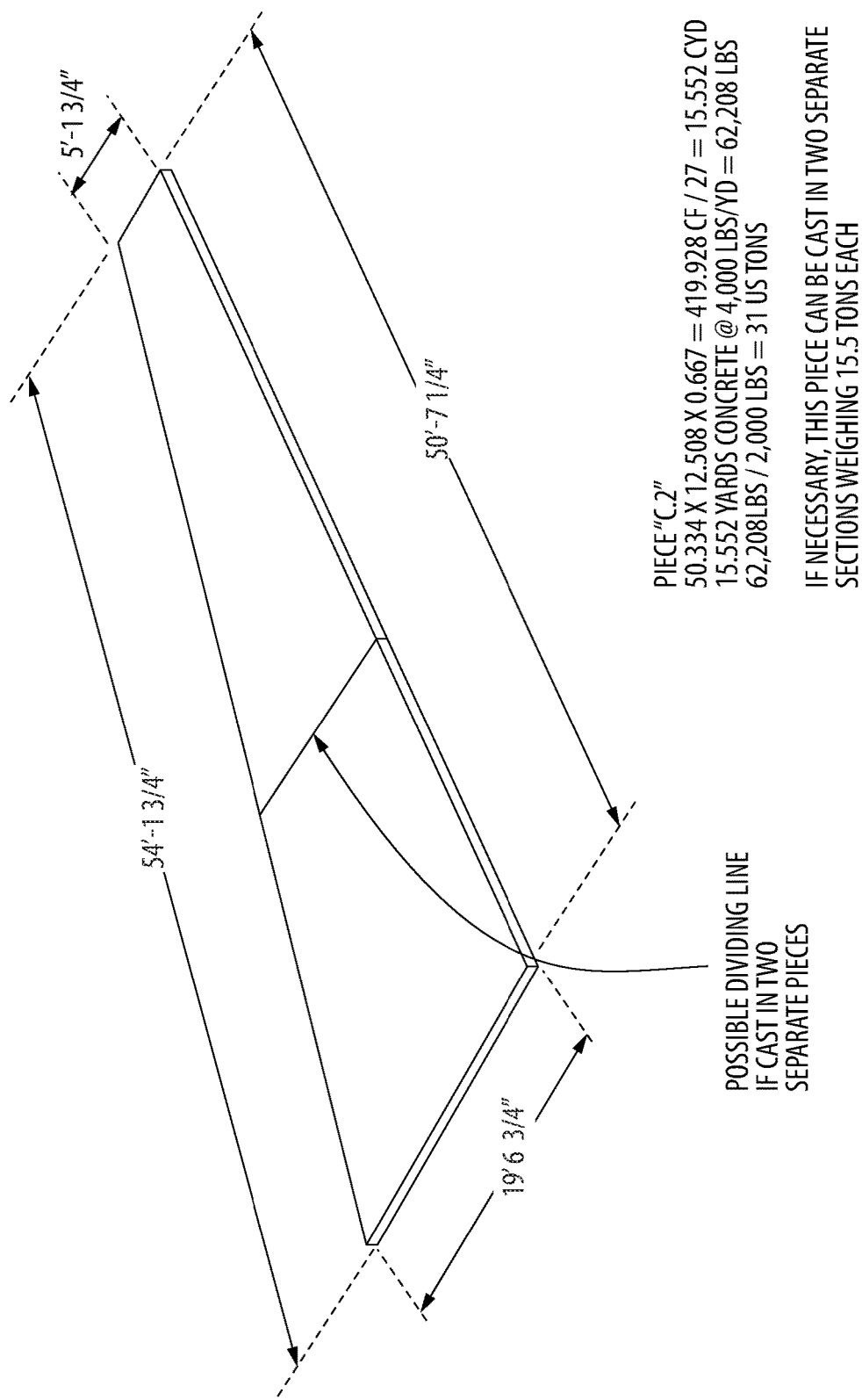
FIG. 14 is a depiction of yet another piece of a skyscraper embodiment of the present invention.
Figure 15:
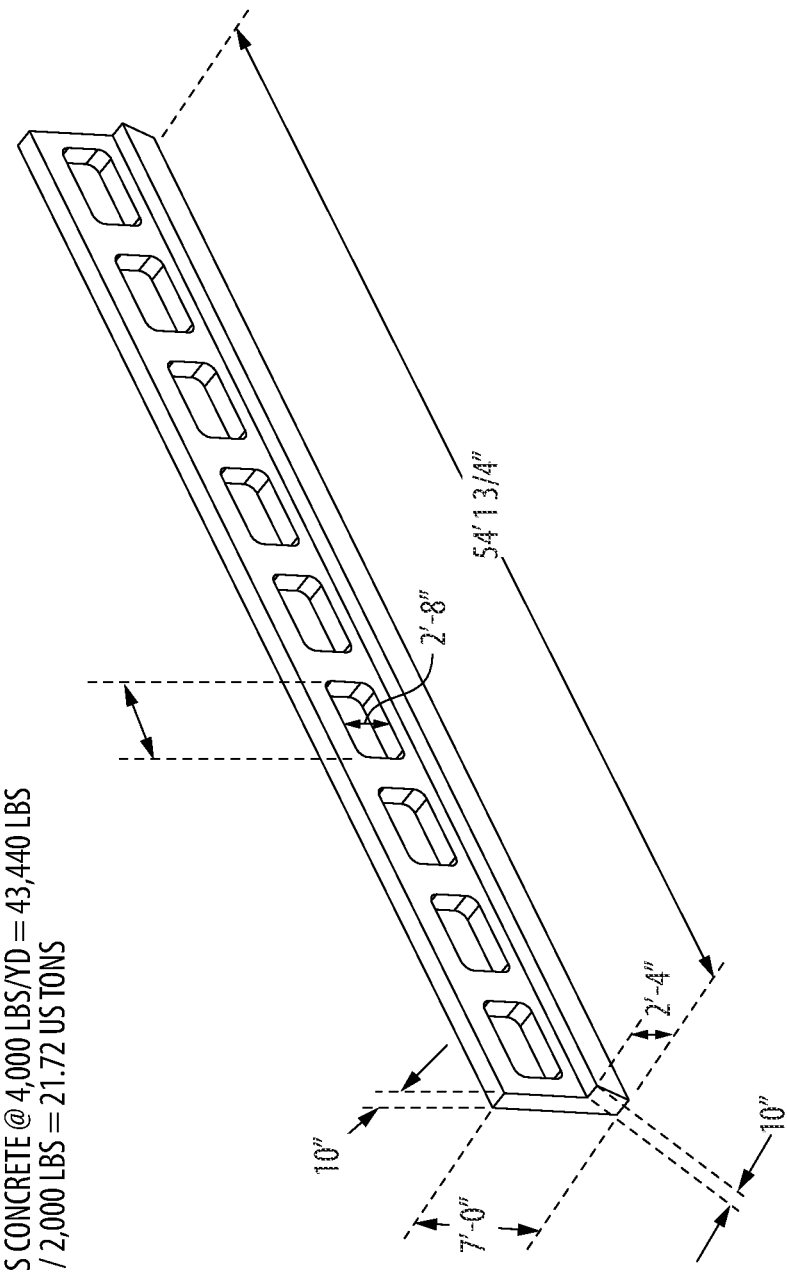
FIG. 15 is a depiction of a further piece of a skyscraper embodiment of the present invention.
Figure 16:
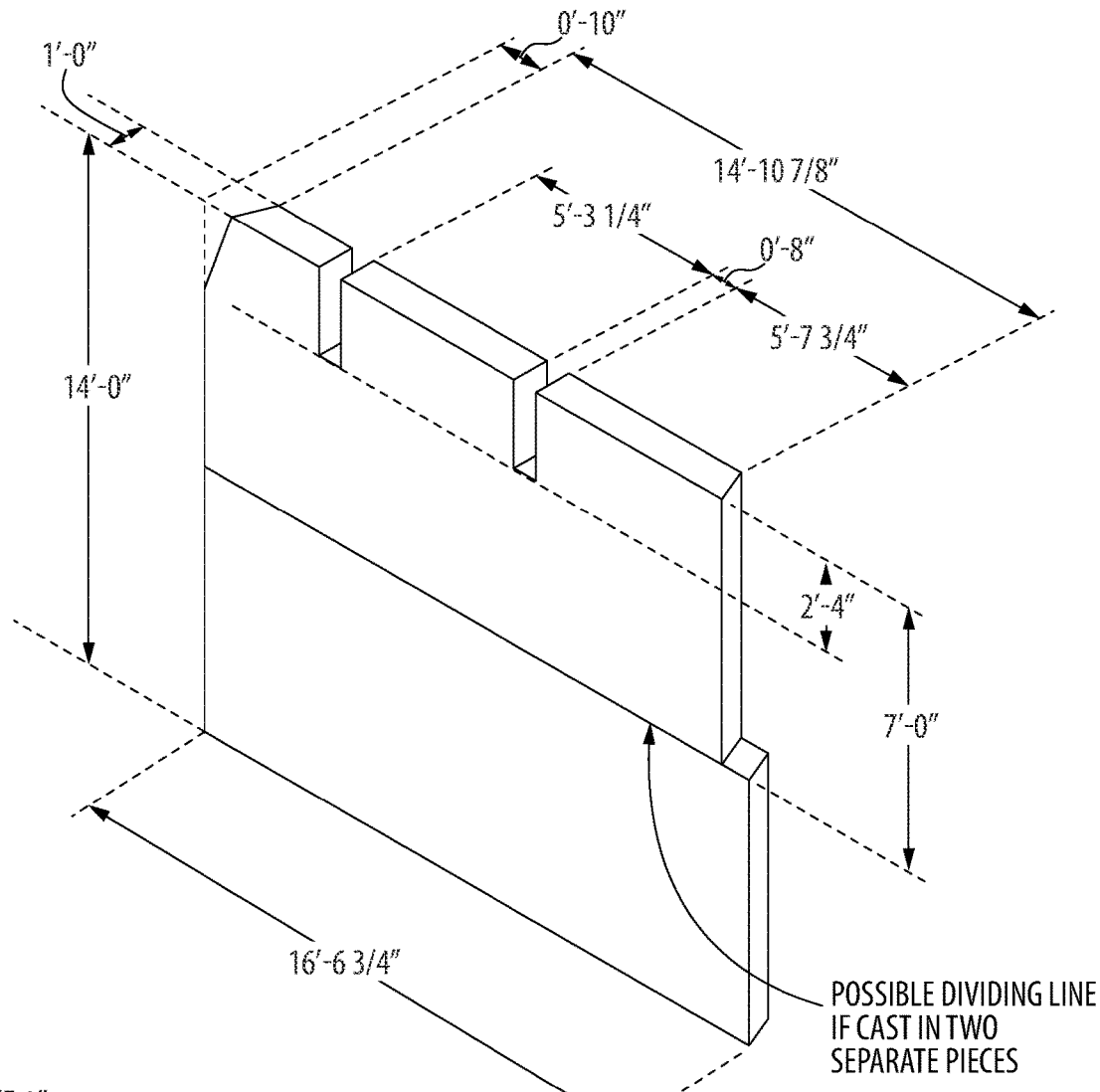
FIG. 16 is a depiction of yet another piece of a skyscraper embodiment of the present invention.
Figure 17:
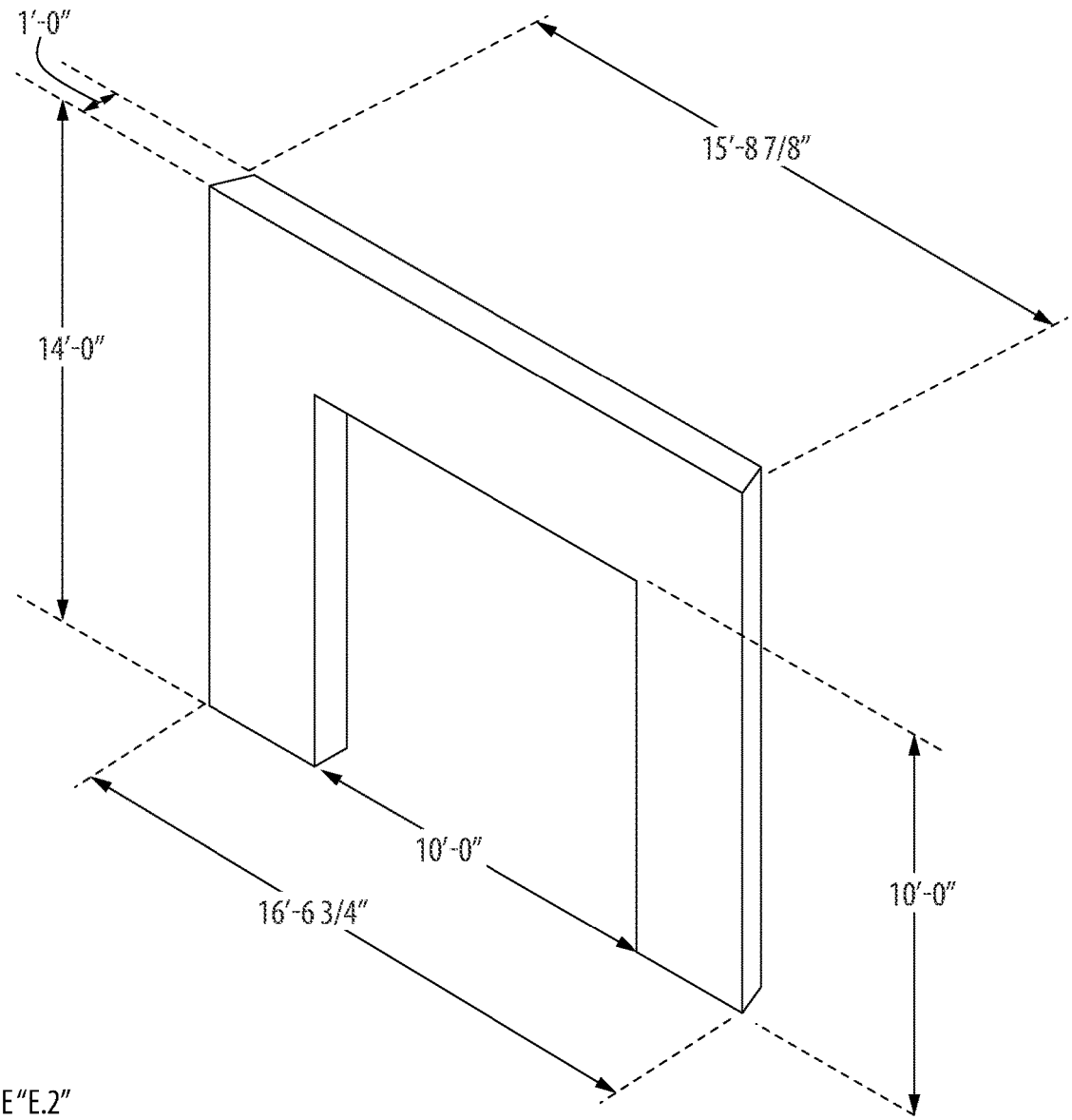
FIG. 17 is a depiction of yet another piece of a skyscraper embodiment of the present invention.
Figure 18:
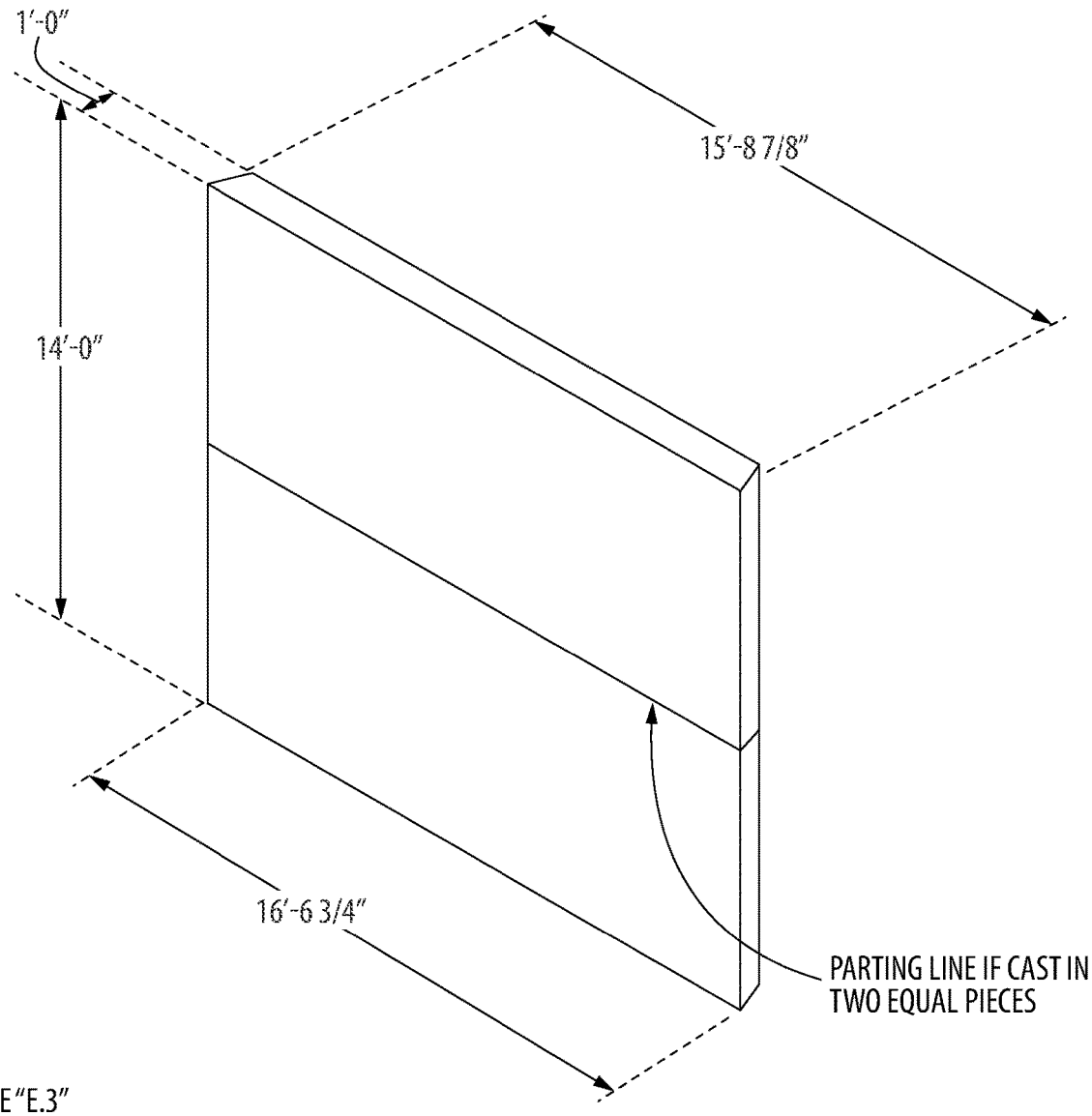
FIG. 18 is a depiction of yet another piece of a skyscraper embodiment of the present invention.
Figure 19:
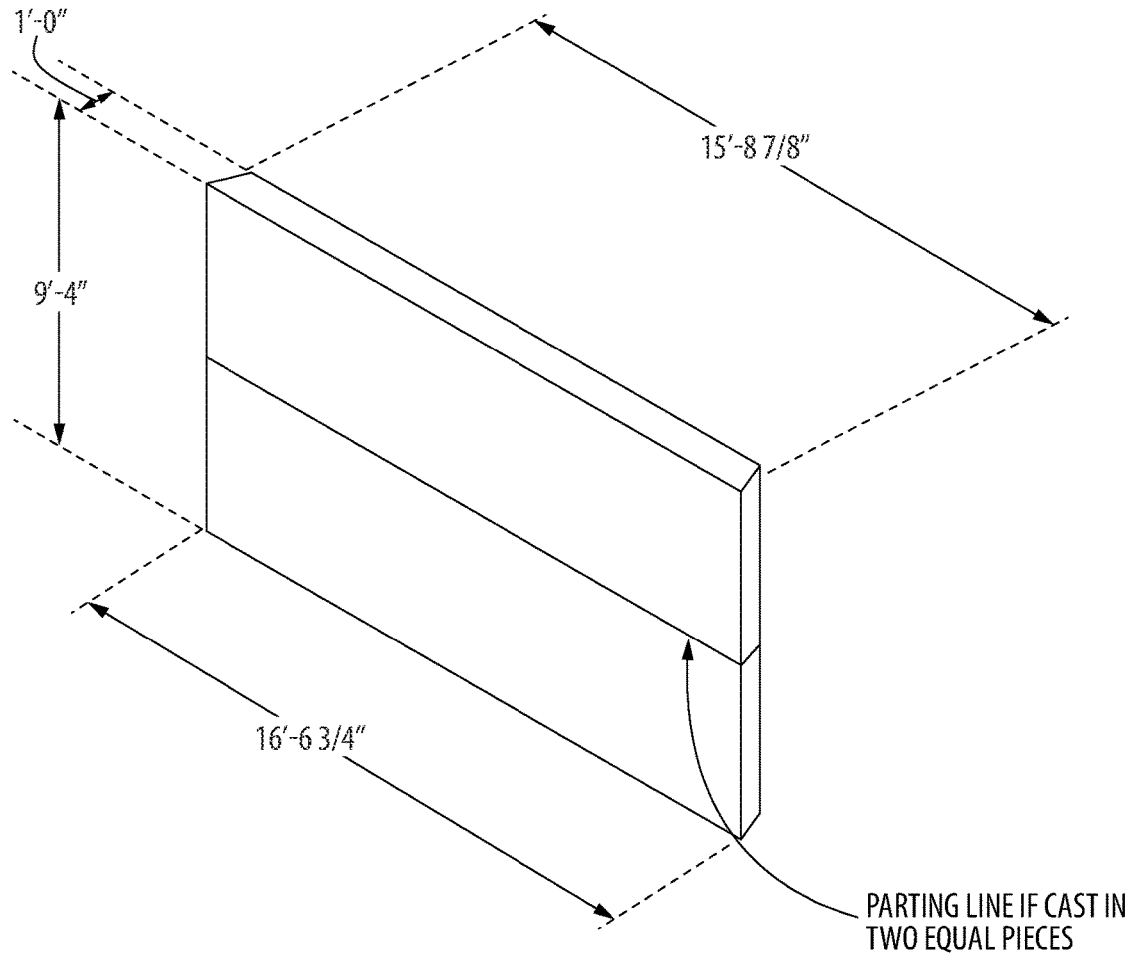
FIG. 19 is a depiction of yet another piece of a skyscraper embodiment of the present invention.
Figure 20:
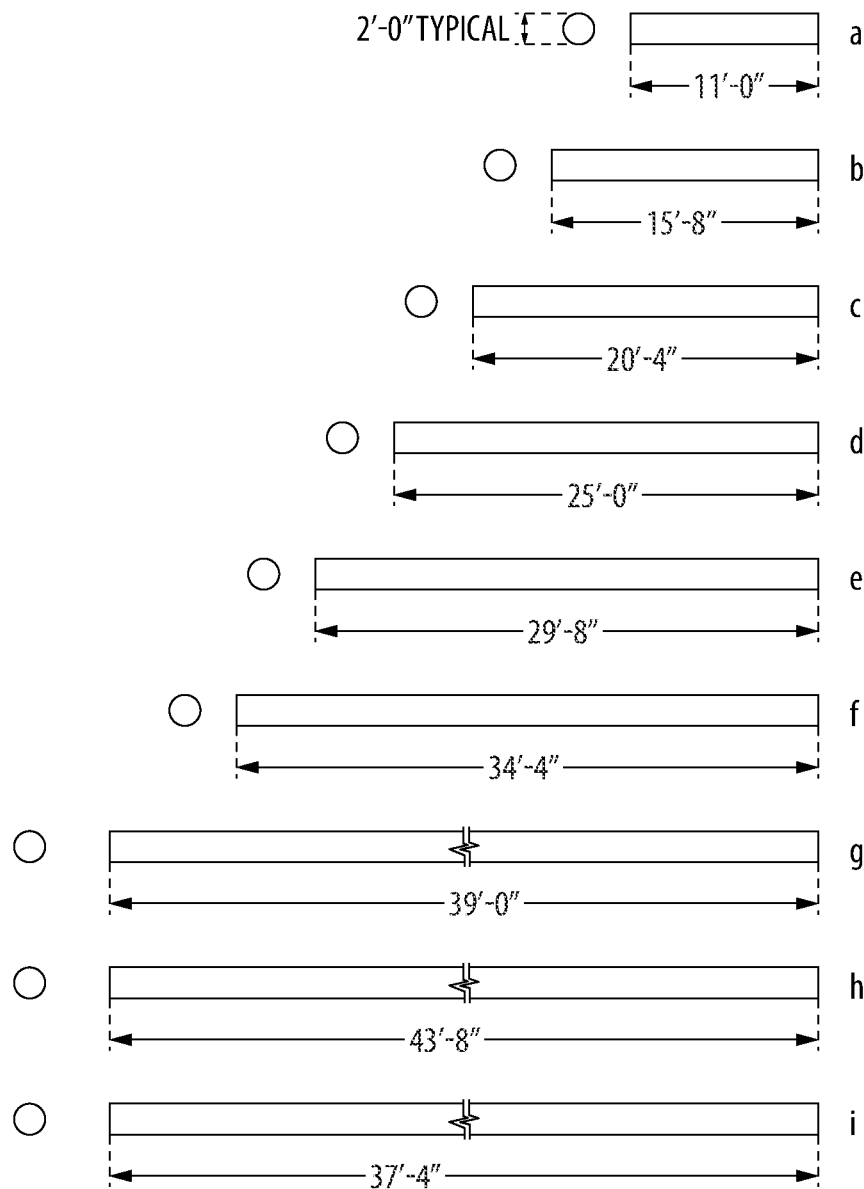
FIG. 20 is a depiction of component pieces of a skyscraper embodiment of the present invention.

| PIECE MARK | APPROXIMATE DIMENSIONS | WEIGHT PER PIECE | NUMBER REQUIRED | TOTAL WEIGHT |
|---|---|---|---|---|
| A (FIG. 10) | 58' × 3' × 0.667' | 8.6 US Tons | 49 Pieces | 421.4 US Tons |
| B (FIG. 11) | 51' × 2' × 0.75' | 6.5 US Tons | 98 Pieces | 637.0 US Tons |
| C1* (FIG. 12 and 13) | 51' × 12' × 0.667' | 29.2 US Tons | 49 Pieces | 1,430.8 US Tons |
| C2* (FIG. 14) | 51' × 12.667' × 0.667' | 31.0 US Tons | 98 Pieces | 3,038.0 US Tons |
| D (FIG. 15) | 54' × 7' × 0.833' | 21.72 US Tons | 50 Pieces | 1,086.0 US Tons |
| E1* (FIG. 16) | 16' × 14' × 1' | 15.9 US Tons | 49 Pieces | 779.1 US Tons |
| E2 (FIG. 17) | 16' × 14' × 1' | 9.3 US Tons | 12 Pieces | 111.6 US Tons |
| E3* (FIG. 18) | 16' × 14' × 1' | 16.7 US Tons | 37 Pieces | 617.9 US Tons |
| E4* (FIG. 19) | 16' × 9.334' × 1' | 11.2 US Tons | 50 Pieces | 560 US Tons |
| Fa (FIG. 20) | 37.334' × 2' Diam. | 8.7 US Tons | 147 Pieces | 1,278.9 US Tons |
| Fb (FIG. 20) | 43.667' × 2' Diam. | 10.2 US Tons | 3 Pieces | 30.6 US Tons |
| Fc (FIG. 20) | 39.000' × 2' Diam. | 9.0 US Tons | 3 Pieces | 27.0 US Tons |
| Fd (FIG. 20) | 34.334' × 2' Diam. | 8.0 US Tons | 3 Pieces | 24.0 US Tons |
| Fe (FIG. 20) | 29.667' × 2' Diam. | 6.8 US Tons | 3 Pieces | 20.4 US Tons |
| Ff (FIG. 20) | 25.000' × 2' Diam. | 5.8 US Tons | 3 Pieces | 17.4 US Tons |
| Fg (FIG. 20) | 20.334' × 2' Diam. | 4.7 US Tons | 3 Pieces | 14.1 US Tons |
| Fh (FIG. 20) | 15.667' × 2' Diam. | 3.6 US Tons | 3 Pieces | 10.8 US Tons |
| Fi (FIG. 20) | 11.000' × 2' Diam. | 2.6 US Tons | 3 Pieces | 7.8 US Tons |

*Pieces marked with an asterisk may be cast in two equal pieces doubling the number and halving the weight of each piece
See FIGS. 9-20 for specific dimensions and weights of each piece and a diagram of the overall structure.

Referring now to FIGS. 21-24: Design standards are (i) withstand category 5 hurricane winds, (ii) withstand tornado force winds for standard duration, (iii) withstand storm surge forces, (iv) withstand seismic forces, (v) require no major maintenance. Quantity required: make 8 complete sections per one story structure, make 40 complete sections per 240' structure. Note; each pie shaped glass enclosure 200 consists of a truncated sloped glass section 202, a vertical front wall 204 of 10'-0' height and one vertical side wall 206. Each adjacent section 208 forms the side closure 206 for the next lower section. The side closure 206 can be glazed or left open depending on the requirements of the uses.

For the purposes of pricing assume all sides 206 are glazed. The drawings represent the major structural members only. The glazier can insert whatever number of smaller mullions in the larger openings 210 as they see fit to obtain the strongest and most economical glazing option.

Figure 21:
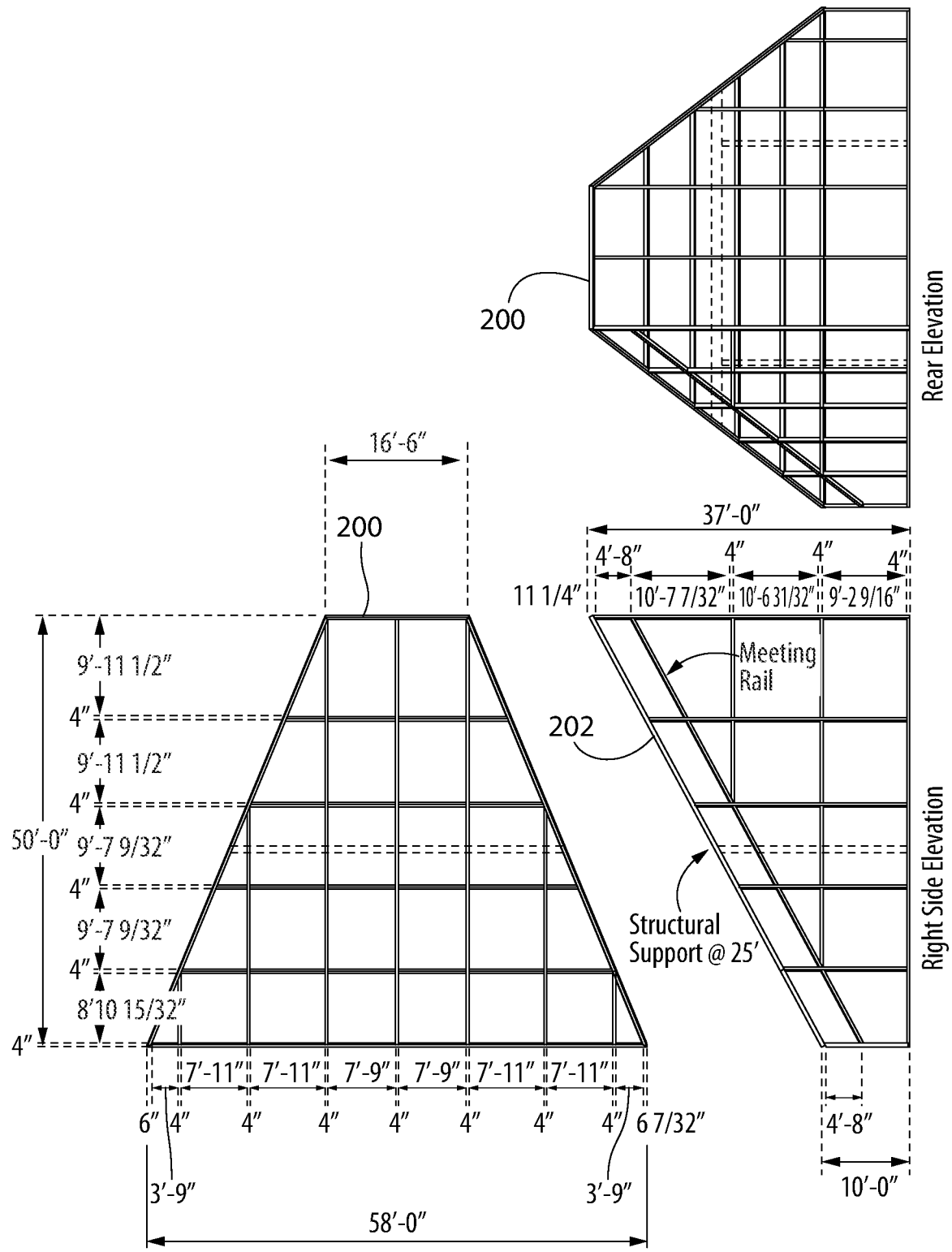
FIG. 21 is a depiction of a pie shaped glass enclosure in an embodiment of the present invention.

Referring now to FIG. 21, materials are 4×8 steel tube, insulated on exterior face and tied into thermally broken casing of infill glazing.

Figure 22:
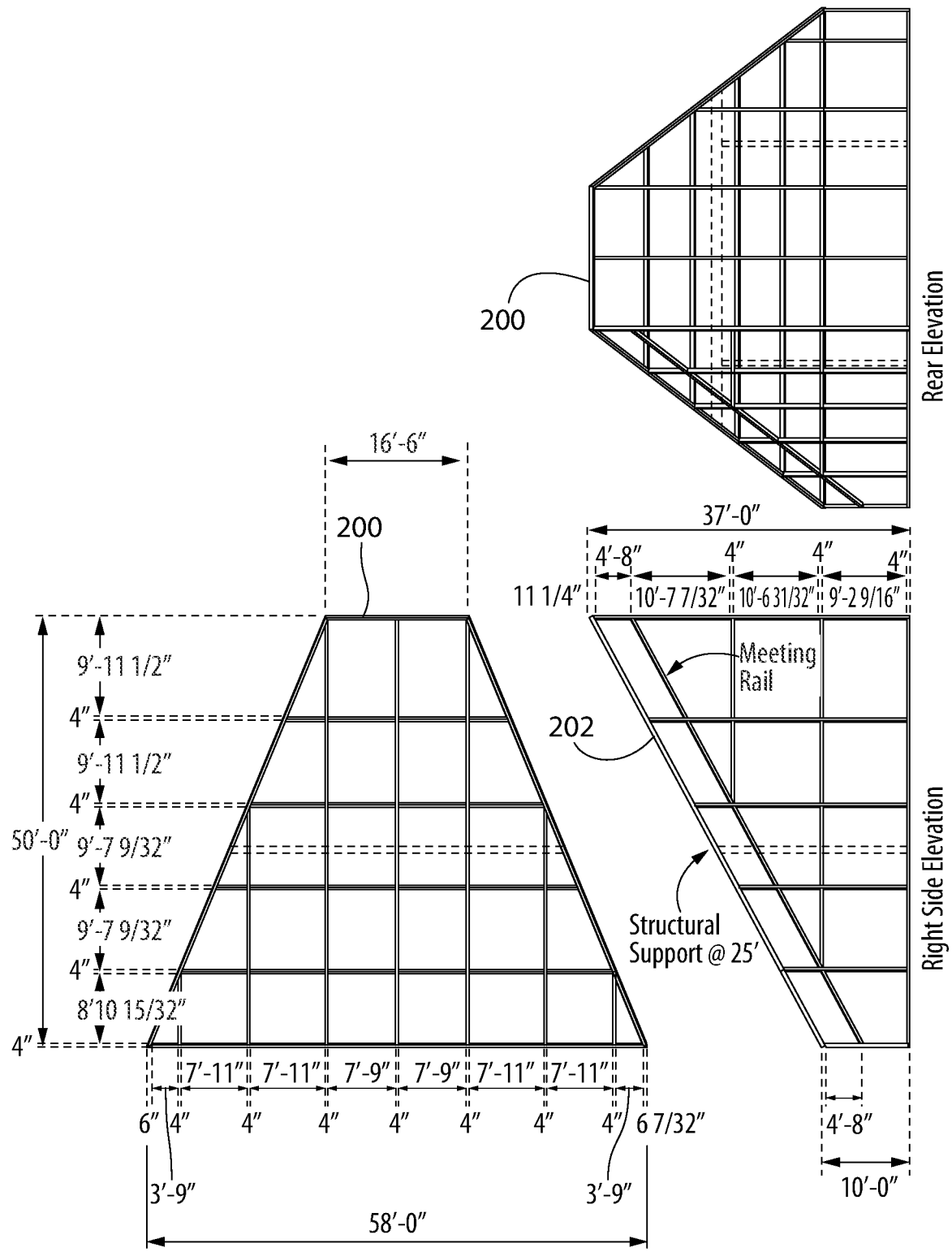
FIG. 22 is a depiction of another pie shaped glass enclosure in an embodiment of the present invention.
Figure 23:
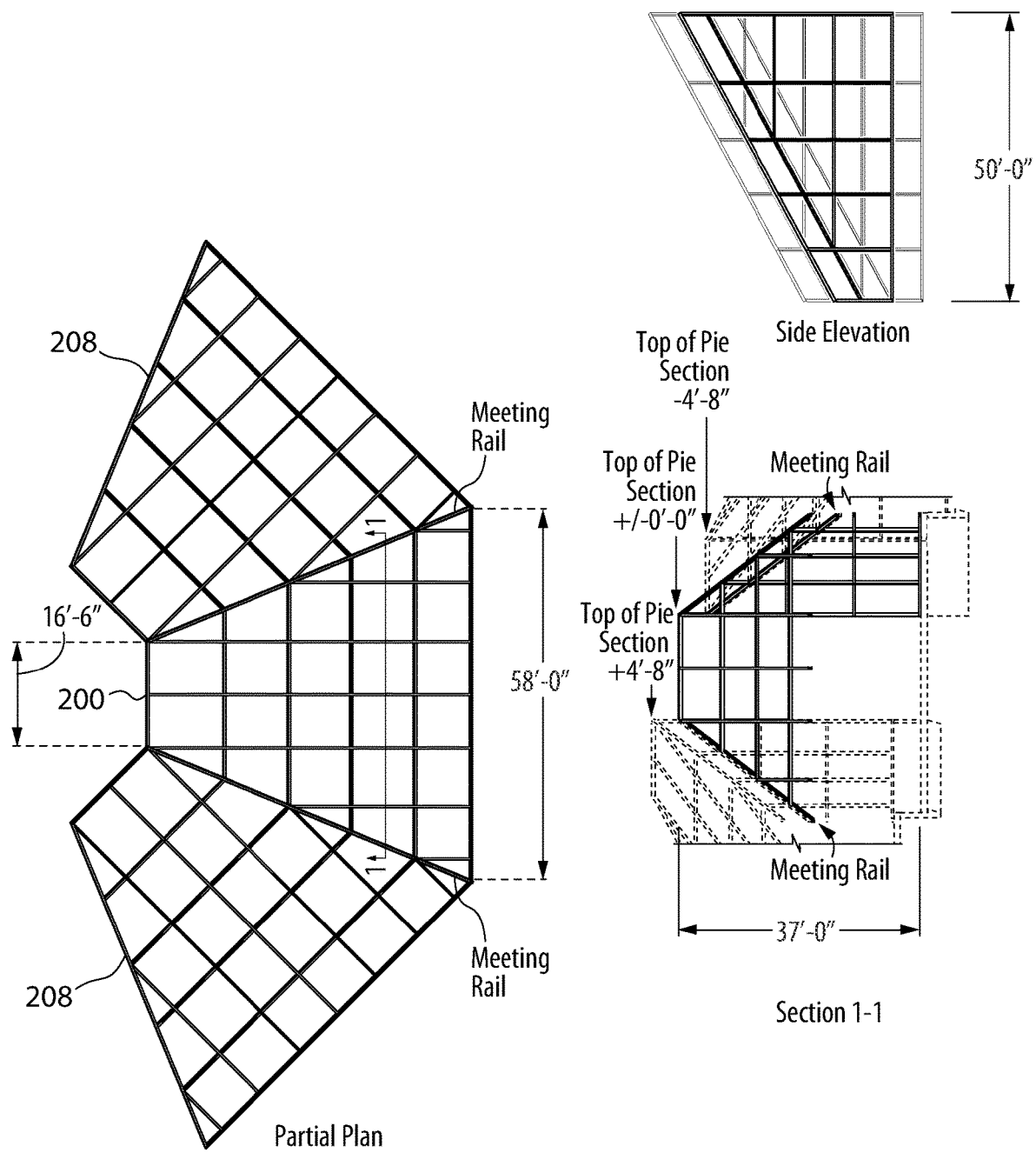
FIG. 23 is a depiction of another pie shaped glass enclosure in an embodiment of the present invention.

Referring now to FIG. 22, materials are 4×8 steel tube, insulated on exterior face and tied into thermally broken casing of infill glazing, and 1" insulated engineered glass.

The invention claimed is:

1. A device comprising:
a spiral building having greenhouse enclosures mounted thereon,
wherein said greenhouse enclosures each include a growing tray having an interior growing area and at least one slanted glass section having an interior surface, the at least one slanted glass section disposed above the growing tray and orientated to be perpendicular to light rays of the sun when the sun is at an equinox position, and
wherein the interior surface is reflective towards the interior growing area, thus reflecting light admitted through the at least one slanted glass section and directing the light to parts of the interior growing area.

2. The device of claim 1, wherein the greenhouse enclosures include a vertical front glass wall coupled to a bottom edge of the at least one slanted glass section.

3. The device of claim 1, wherein the greenhouse enclosures include at least one vertical glass sidewall coupled to a side edge of the at least one slanted glass section.

4. The device of claim 1, wherein the at least one slanted glass section is disposed above the growing tray at an angle determined by a location of the spiral building relative to the Equator.

5. The device of claim 1, wherein the at least one slanted glass section includes a plurality of glass panels.

6. The device of claim 1, wherein the at least one slanted glass section is trapezoidal in shape.

7. A spiral building comprising:
an interior growing area having a plurality of growing trays; and
a plurality of slanted glass sections each disposed at least partially above one of the plurality of growing trays at an angle determined by a location of the spiral building relative to the Equator, the plurality of slanted glass sections each having an inside surface being reflective and configured to reflect light within the interior growing area.

8. A spiral green house building comprising:
a plurality of floor platforms, the plurality of floor platforms being arranged in a stepped spiral staircase orientation around the spiral green house building;
a growing tray having an interior growing area disposed on each of the plurality of floor platforms; and
a glass greenhouse enclosure disposed over each growing tray, each glass greenhouse enclosure including a trapezoidal slanted glass top section, a rectangular vertical front glass wall extending between a bottom edge of the trapezoidal slanted top glass section and one of the plurality of floor platforms, and a vertical glass sidewall extending between a side edge of the trapezoidal slanted top glass section, a side edge of the rectangular vertical front glass wall and a side edge of an adjacent glass greenhouse enclosure, the trapezoidal slanted top glass section, the rectangular vertical front glass wall, and the vertical glass sidewall each being comprised of a plurality of glass panels, the trapezoidal slanted top glass section having a reflective surface disposed on an interior of the trapezoidal slanted top glass section facing towards the interior growing area such that light inside the interior growing area is at least partially reflected back by the reflective surface and directed to parts of the interior growing area, the trapezoidal slanted top glass section orientated to be perpendicular to light rays of the sun when the sun is at an equinox position.

* * * * *